United States Patent
Schill et al.

(10) Patent No.: US 8,961,635 B2
(45) Date of Patent: Feb. 24, 2015

(54) DEVICE FOR THE PURIFICATION OF PARTICLE-LADEN GASES

(75) Inventors: Andreas Schill, Stutensee (DE); Benjamin Heller, Karlsruhe (DE)

(73) Assignee: Boa Balg—und Kompensatoren—Technologie GmbH, Stutensee (DE)

( * ) Notice: Subject to any disclaimer, the term of this patent is extended or adjusted under 35 U.S.C. 154(b) by 73 days.

(21) Appl. No.: 13/699,813

(22) PCT Filed: Jan. 12, 2012

(86) PCT No.: PCT/EP2012/000112
§ 371 (c)(1), (2), (4) Date: Nov. 26, 2012

(87) PCT Pub. No.: WO2012/107154
PCT Pub. Date: Aug. 16, 2012

(65) Prior Publication Data
US 2013/0067872 A1    Mar. 21, 2013

(30) Foreign Application Priority Data
Feb. 9, 2011   (DE) ............... 20 2011 002 517 U

(51) Int. Cl.
| | |
|---|---|
| *B01D 50/00* | (2006.01) |
| *B01D 46/00* | (2006.01) |
| *F01N 3/021* | (2006.01) |
| *F01N 3/022* | (2006.01) |
| *F01N 13/18* | (2010.01) |
| *B01D 46/10* | (2006.01) |
| *F16L 27/111* | (2006.01) |
| *F16L 51/02* | (2006.01) |

(52) U.S. Cl.
CPC ............ *B01D 46/0016* (2013.01); *F01N 3/021* (2013.01); *F01N 3/0215* (2013.01); *F01N 3/0226* (2013.01); *F01N 13/1816* (2013.01); *B01D 46/0005* (2013.01); *B01D 46/10* (2013.01); *F16L 27/111* (2013.01); *F16L 51/027* (2013.01); *Y02T 10/20* (2013.01)
USPC ............ 55/319; 55/300; 55/482; 55/483; 55/493; 96/147

(58) Field of Classification Search
CPC ........................... B01D 46/0075; B01D 46/04
USPC ............ 55/300, 482–483, 493, 319; 96/147
See application file for complete search history.

(56) References Cited

U.S. PATENT DOCUMENTS

2010/0083646 A1 *   4/2010   Poppe ............................ 60/311
2010/0192528 A1 *   8/2010   Mann et al. .................... 55/483

FOREIGN PATENT DOCUMENTS

| DE | 22 09 487 A1 | 9/1973 |
| DE | 197 22 603 C1 | 8/1998 |
| DE | 103 07 651 A1 | 9/2004 |
| DE | 10 2004 018 693 A1 | 11/2005 |
| DE | 10 2009 043 577 A1 | 5/2010 |
| EP | 2 101 049 A2 | 9/2009 |

* cited by examiner

*Primary Examiner* — Jason M Greene
*Assistant Examiner* — Karla Hawkins
(74) *Attorney, Agent, or Firm* — McGlew and Tuttle, P.C.

(57) ABSTRACT

The present invention pertains to a device for cleaning gases containing particles with a bellows and with at least one filter element arranged in the bellows. To ensure effective filtration without limitation of the mobility of the bellows, the present invention provides for at least one filter element to be fixed at a bellows inner flange of a bellows corrugation in a positive-locking manner.

20 Claims, 5 Drawing Sheets

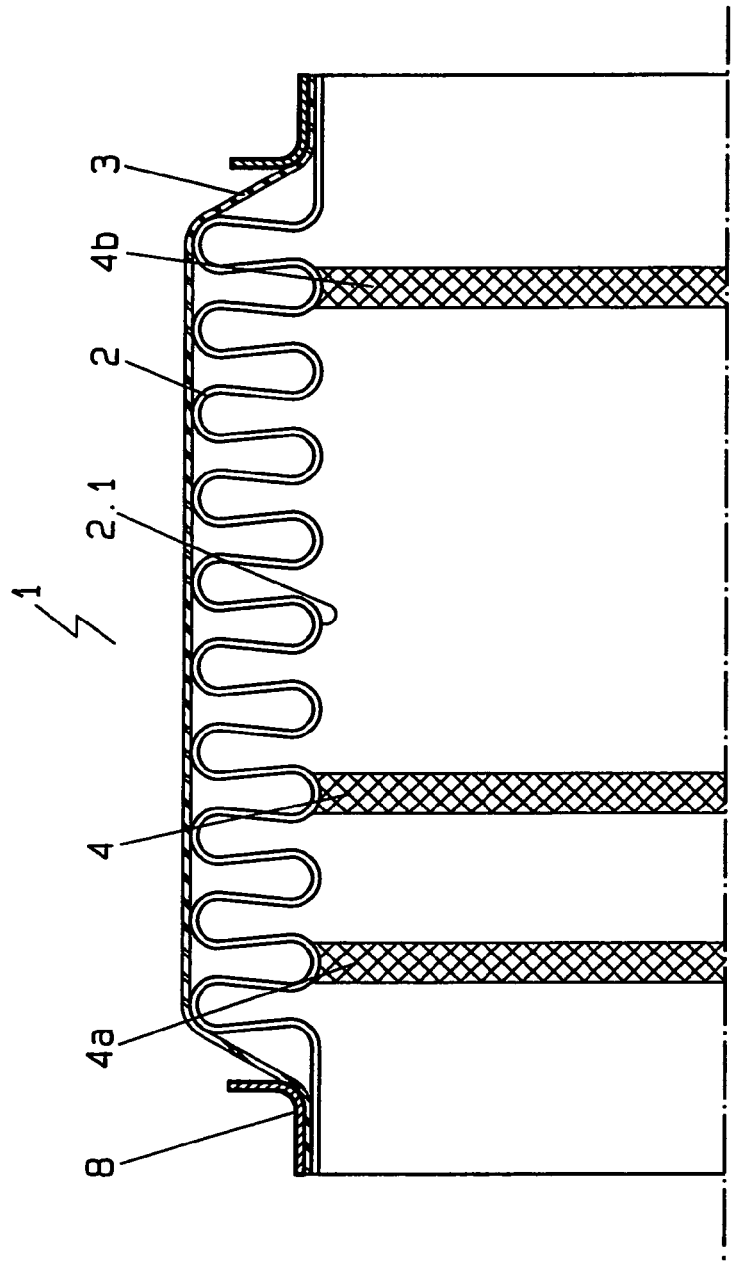

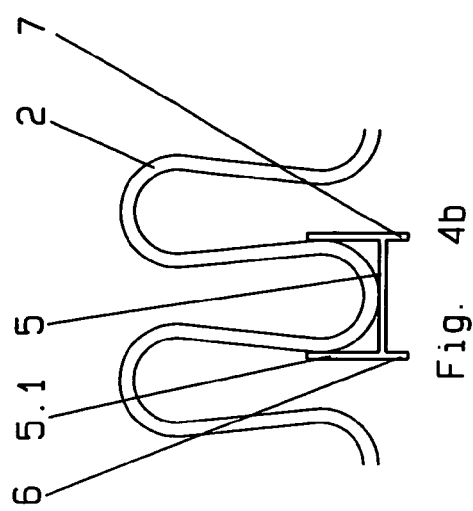
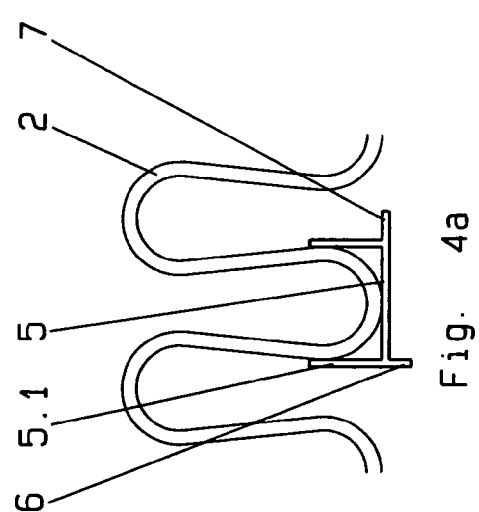

DEVICE FOR THE PURIFICATION OF PARTICLE-LADEN GASES

CROSS REFERENCE TO RELATED APPLICATIONS

This application is a United States National Phase application of International Application PCT/EP2012/000112 and claims the benefit of priority under 35 U.S.C. §119 of German patent application DE 20 2011 002 517.9 filed Feb. 9, 2011, the entire contents of which are incorporated herein by reference.

FIELD OF THE INVENTION

The invention pertains to a device for cleaning gases containing particles, with a bellows and with at least one filter element arranged in the bellows.

BACKGROUND OF THE INVENTION

Such a device may be provided as an uncoupling element, optionally provided with additional individual components in exhaust gas lines of a motor vehicle as a soot filter. Furthermore, such a device may be used in the exhaust gas return line of a motor vehicle as a filter for loosened particles of a diesel particle filter. Moreover, there are many different further possibilities for use as filters, in which a flexible guiding element is necessary with the bellows.

In the devices of this class known from practice, filter elements are arranged, for example, in a rigid pipe socket, which at least protrudes into the bellows, on one side at a bellows element, or such a pipe socket protruding axially into the bellows is made of filter material. The mobility of the bellows is limited by such embodiments.

SUMMARY OF THE INVENTION

The basic object of the present invention is therefore to improve a device of this class for cleaning gases containing particles such that effective filtering of the gases takes place without limitation of the mobility of the bellows.

This object is accomplished according to the present invention in a device of this class by the at least one filter element being fixed in a positive-locking manner at a bellows inner flange of a bellows corrugation.

The mobility of the bellows is fully guaranteed by the solution according to the present invention, because the risk of collision of bellows corrugations with filter tubes inserted into the bellows or with other inserts during motion of the bellows is absent. The filter elements being held in a positive-locking manner according to the present invention at the bellows inner flange are moved together synchronously with the bellows corrugation during any motions of the bellows, be they axial, lateral or angular motions, without the risk of collision occurring, because the filter elements are held directly at a bellows corrugation in the described manner. Mobility is not limited hereby, because the filter elements are held just at exactly one bellows corrugation.

To fix the filter elements at a bellows corrugation, provisions may be made either for the outer circumference of the filter element to have, in some segments or over the entire circumference, a shape adapted to the contour of the bellows inner flange, extending partly around same, or for the filter elements to be held by clamps on the inside of the bellows inner flange. Provisions are made in the latter case in a variant of the present invention for the clamps to have outwardly projecting legs, which act each on an axial side of a bellows inner flange and to have two inner legs, which act on both sides on the filter element.

Provisions may, furthermore, be made in a variant for additional filter material to be enclosed between two filter elements fixed at the bellows inner flange of a bellows corrugation, wherein said additional filter material, which is inserted between two filter elements being held directly at bellows corrugations in said manner and is held by these, is soft and flexible, so that the mobility of the bellows is likewise not limited by this, either.

Metal meshes or metal fabrics, optionally in a multilayer form, preferably in the form of metal braids or square mesh fabrics or nonwoven metal netting, may be used as materials for the filter elements or inserted filter material.

As far as the process is concerned, the filter elements are fixed at the bellows inner flange in a positive-locking manner. This is done in the first, preferred embodiment by the outer circumference of the filter element being provided with a concave shape adapted to the contour of the bellows inner flange in some segments or over the entire circumference. The filter element is then inserted into the bellows up into a bellows corrugation and then compressed on both sides, while it radially expands and, in particular, the shape-adapted areas come into contact with the bellows inner flange in a positive-locking manner.

If more than one filter element held by corresponding adaptation of the circumferential contour is to be inserted into a bellows, these filter elements are given a shape adapted to the contour of the bellows inner flange of a bellows corrugation at first in some segments or over the entire circumference. Furthermore, they are brought at first to a slightly calotte-like shape by being pressed, after being inserted into a bellows corrugation, into the bellows inner flange in the area of a bellows inner flange by additional axial pushing with a punch and thus being fixed in a positive-locking manner.

In the case of the second type of fixation mentioned above by means of clamps, such clamps are first fixed with their radially outwardly projecting legs at the bellows inner flange of a bellows corrugation in a non-positive manner, one of the legs directed radially inwardly in the final state being still directed at first axially. Three clamps are preferably arranged over the circumference, but four or five clamps may be provided as well.

The filter element is then brought from an insertion side into the area of said clamps fixed at a bellows inner flange, with the inwardly directed leg of the clamps, which leg faces away from the insertion side, acting as a stop for the filter element. The at first axially directed leg facing the insertion side is finally bent off radially inwardly, so that the filter element is held between the two radially inwardly directed legs.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a corresponding sectional view through another embodiment of the device according to the present invention with another type of fixation of the filter elements;

FIG. 4a is an enlarged sectional view of a clamp fixed to a bellows inner flange of a bellows corrugation before insertion of a filter element;

FIG. 4b is an enlarged sectional view of a clamp fixed at a bellows inner flange of a bellows corrugation with bent-off legs after insertion of a filter element.

DESCRIPTION OF THE PREFERRED EMBODIMENTS

Figure 1:
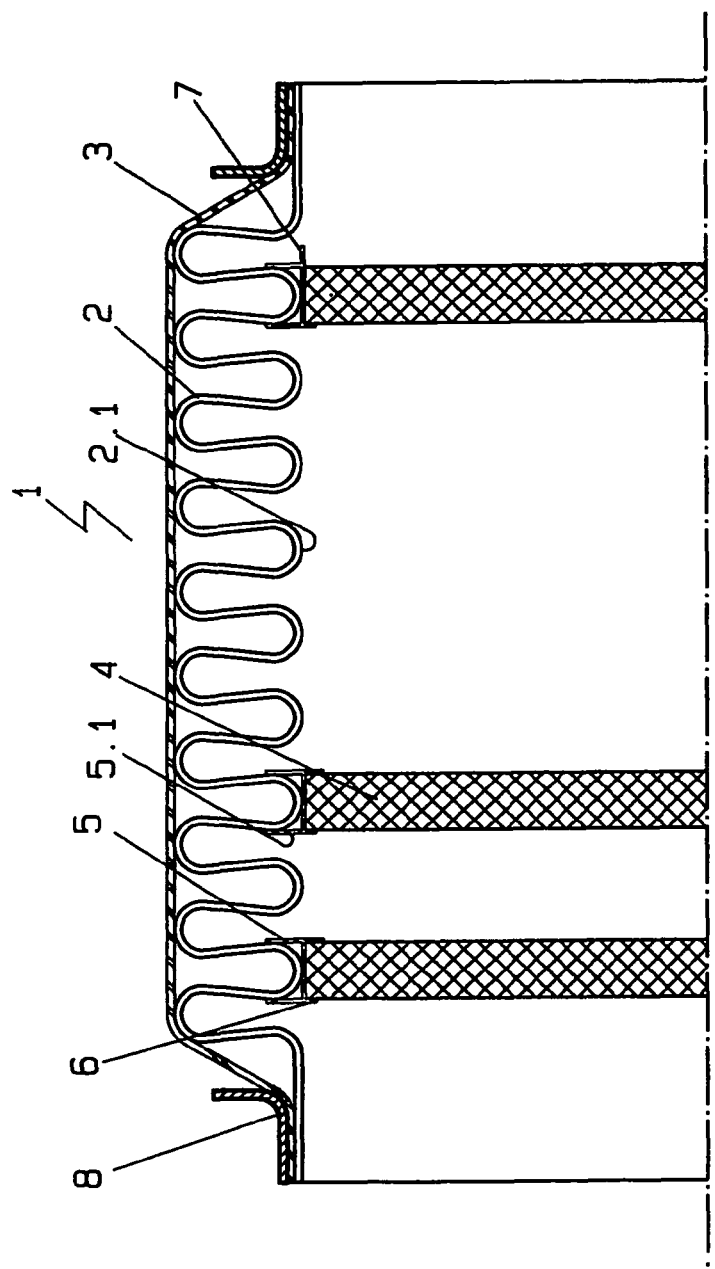
FIG. 1 is a longitudinal sectional view through the upper half of a first embodiment of the device according to the present invention for cleaning gases containing particles.

A device 1 according to the present invention for cleaning gases containing particles has a metallic bellows 2. This is covered by a metal mesh or knitted tube 3 in the exemplary embodiment being shown, with profile rings 8 being provided at the two ends of the bellows for fixation.

Three filter elements 4 in the form of flat cylindrical filter disks are arranged within the bellows 2 at bellows inner flanges 2.1 of the bellows corrugations in the exemplary embodiment being shown. These filter disks are held by clamps 5 in the exemplary embodiment shown in FIG. 1. Three clamps 5 are preferably distributed uniformly over the circumference, but four or five clamps may be provided as well. The clamps 5 are held at the bellows inner flanges 2.1 of a bellows corrugation each by radially outwardly projecting legs 5.1 in a non-positive manner, while the disk-shaped filter elements 4 are clamped between radially inwardly projecting legs 6, 7.

For assembly, the clamps 5 are first pushed over the bellows inner flange 2.1, with the inner leg 7 directed towards the side from the assembly still being directed axially and hence at right angles to the other legs 5.1, 6 (as this can be seen in the right-hand filter element in FIG. 1). The filter element 4 is then pushed in from the assembly side, the inwardly directed leg 6 acting as a stop for the filter element 4. Leg 7 is finally bent off radially inwardly, so that filter element 4 is held between it and leg 6, as it can be seen in the two elements on the left-hand side in FIG. 1.

The filter elements 4 preferably consist of metal mesh or metal fabric, such as metal braids or square mesh fabrics made of stainless steel, such as chromium, nickel or molybdenum steel with high corrosion resistance. The filter elements may be monolayer or multilayer elements, and the layers may have different mesh densities and wire thicknesses. The pore size of a filter layer may thus be, for example, between less than 1 μm to 100 μm with wire thicknesses on the same order of magnitude, and protective and support fabrics may have mesh sizes and wire thicknesses of up to the mm range.

Figure 2:
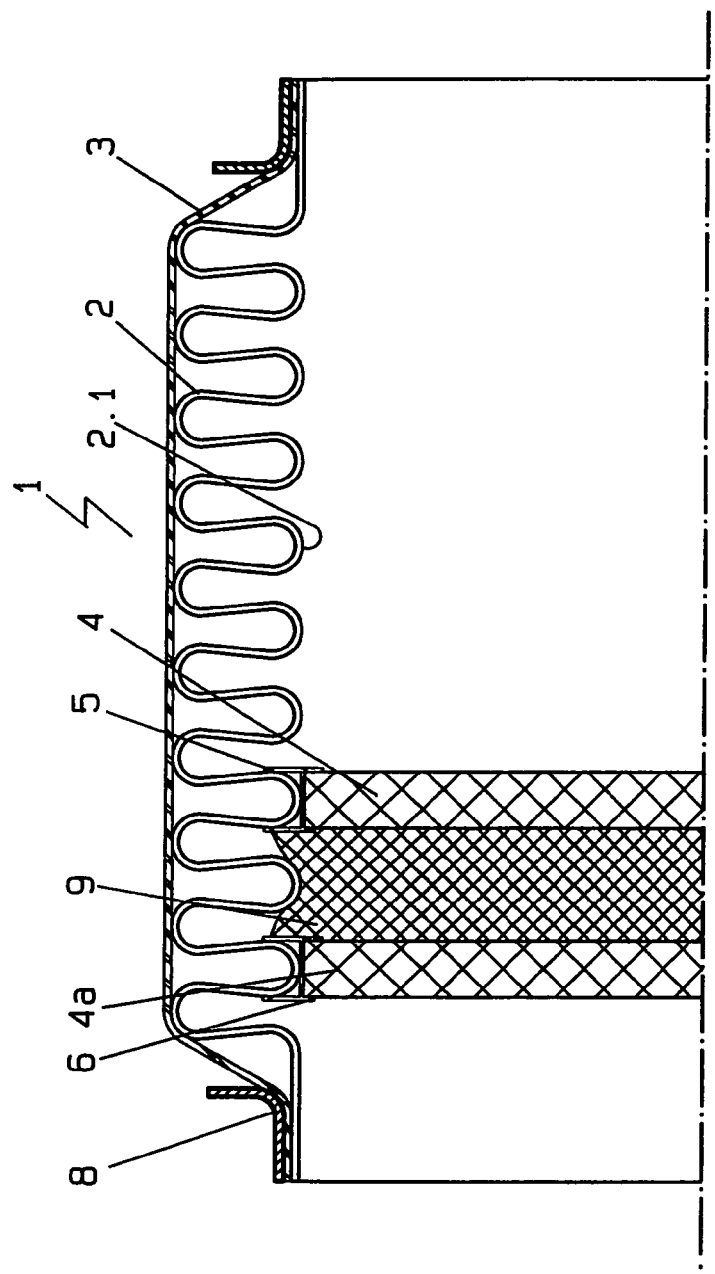
FIG. 2 is a corresponding sectional view through another embodiment of the device according to the present invention.

Filter material 9 is also arranged between filter elements 4 in the form of flat cylindrical filter disks 4, 4a in the embodiment according to FIG. 2, this material being a soft, flexible filter material, such as a nonwoven metal netting, which does not limit the mobility of the bellows.

In the embodiment according to FIG. 3, the filter elements 4 are held at the bellows inner flanges 2.1 of a bellows corrugation in a positive-locking manner directly by the shape of their circumferential edge, as this is shown in FIG. 3. They consist of pressed metal wire or pressed wire mesh. A single filter element may now be fixed by being inserted at first into bellows 2 up to a bellows corrugation with a radial dimension that corresponds approximately to the bellows inner diameter and then being compressed axially from both sides, while filter element 4 expands radially and adapts itself to the bellows inner flange 2.1 of the bellows corrugation, as this can be seen in FIG. 3.

Figure 5:
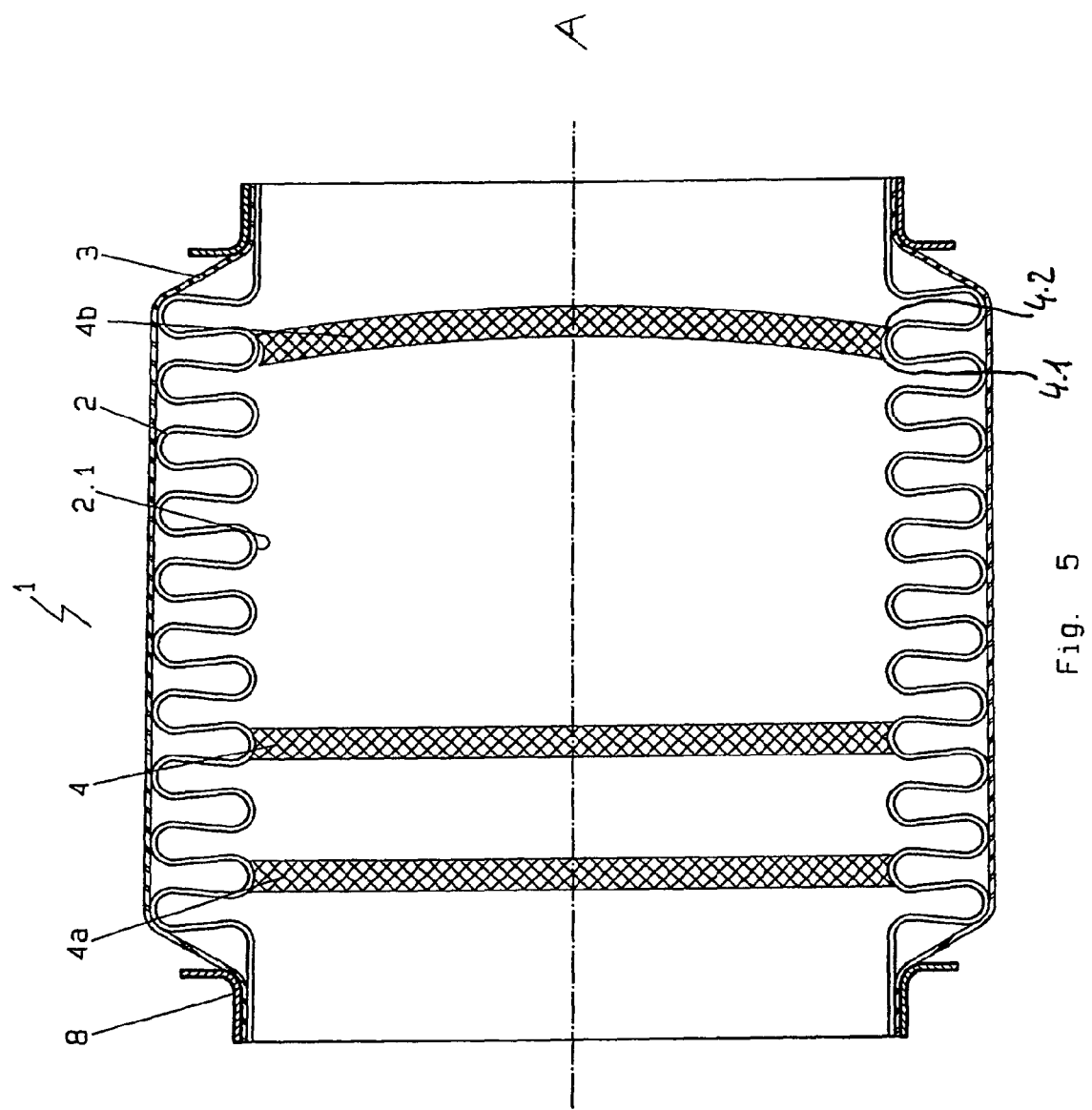
FIG. 5 is a longitudinal sectional view of another embodiment of the uncoupling element according to the present invention.

If more than one filter element 4, 4a, 4b is to be inserted into a bellows, the filter elements are prefabricated in a slightly calotte-like shape (FIG. 5, right-hand side). They can be slid freely over the bellows inner flange 2.1 with their circumferential edge 4.1, which faces away from the push-in side A and is located on their concave side, while their convex-side circumferential flange 4.2 facing the push-in side A extends behind the bellows inner flange 2.1 in a positive-locking manner. If force is applied in the area of the circumferential edge 4.2 only, the filter disk 4b can be pushed over the bellows inner flange 2.1. If force is applied centrally, by means of a punch, filter disk 4b with its circumferential edge 4.2 finds an abutment at the bellows inner flange 2.1 and is pressed, as a result of which the other circumferential edge 4.1 will also come into contact with the bellows inner flange 2.1 and the filter disk corresponds to the disks 4, 4a.

While specific embodiments of the invention have been shown and described in detail to illustrate the application of the principles of the invention, it will be understood that the invention may be embodied otherwise without departing from such principles.

The invention claimed is:

1. A device for cleaning gases containing particles, the device comprising:
    a bellows comprising a bellows corrugation, said bellows corrugation comprising a bellows corrugation inner side;
    at least one filter element arranged in said bellows, said at least one filter element being fixed at said bellows corrugation inner side of said bellows corrugation in a positive-locking manner.

2. A device in accordance with claim 1, wherein the bellows corrugation comprises a radially outer corrugation crest portion, an inner corrugation base portion and at least one substantially radially extending corrugation flank portion, said radially outer corrugation crest portion being integrally connected to said to said inner corrugation base portion via said at least one substantially radially extending corrugation flank portion, wherein said at least one filter element is fixed at said inner corrugation base portion.

3. A device in accordance with claim 2, wherein said at least one filter elements is held by at least one clamp on said bellows corrugation inner side.

4. A device in accordance with claim 3, wherein said at least one clamp has outwardly projecting legs, which act each on said bellows corrugation inner side, and said at least one clamp has two inner legs, which act on the at least one filter element on both sides.

5. A device in accordance with claim 2, wherein additional filter material is enclosed between two filter elements, each of said filter elements being fixed at the bellows corrugation inner side.

6. A device in accordance with claim 2, further comprising:
    another filter element to provide a plurality of filter elements, said bellows comprising another bellows corrugation to provide a plurality of bellows corrugations, each of said bellows corrugations having a bellows corrugation inner surface on said bellows corrugation inner side;

a plurality of clamps, wherein each of said filter elements is held by one or more said clamps on said bellows corrugation inner surface of one of said bellows corrugations.

7. A device in accordance with claim 6, wherein said bellow corrugations comprises a plurality of substantially radially extending flanks, a plurality of outer crest portions and a plurality of corrugation inner base portions, each of said plurality of substantially radially extending flanks being integrally connected to one of said plurality of outer crest portions and one of said corrugation inner base portions, each of said clamps having outwardly projecting legs, each of said outwardly projecting legs being in direct contact with an inner side of one of said substantially radially extending flanks, each of said clamps having two inner legs, which act on one of said filter elements on both sides, wherein one of said corrugation inner base portions is located between one of said outwardly projecting legs and another one of said outwardly projecting legs.

8. A device in accordance with claim 6, wherein additional filter material is enclosed between two of said filter elements, each of said filter elements being fixed at the bellows corrugation inner side of one of said bellows corrugation.

9. A device in accordance with claim 2, wherein an outer circumference of the at least one filter element has a shape adapted to a contour of the bellows corrugation inner side in some segments or over an entire circumference and partially extends over said bellows corrugation inner side.

10. A device for cleaning gases containing particles, the device comprising:
   a bellows comprising an outer surface defining a plurality of bellows corrugations, said plurality of corrugations comprising a plurality of inner base portions and a plurality of outer crest portions, each of said outer crest portions defining an outermost portion of said bellows and each of said inner base portions defining an innermost portion of said bellows;
   at least one filter element arranged in said bellows, said at least one filter element being fixed at said one of said inner base portions in a positive-locking manner.

11. A device in accordance with claim 10, wherein said at least one filter element is arranged between one of said outer crest portions and an adjacent one of said outer crest portions.

12. A device in accordance with claim 11, wherein said plurality of corrugations comprises a plurality of substantially radially extending flank portions, each of said substantially radially extending flank portions being integrally connected to one of said outer crest portions and one of said inner base portions.

13. A device in accordance with claim 12, wherein said at least one filter elements is held by at least one clamp, said at least one clamp engaging said at least one filter material and said one of said inner base portions.

14. A device in accordance with claim 13, wherein said at least one clamp has outwardly projecting legs, each of said outwardly projecting legs engaging one of said substantially radially extending flank portions, said at least one clamp having two inner legs, each of said two inner legs engaging one side of said at least one filter element.

15. A device in accordance with claim 10, further comprising:
   another filter element to provide a plurality of filter elements;
   a plurality of clamps, each of said clamps engaging one of said filter elements and one of said substantially radially extending flank portions.

16. A device in accordance with claim 15, wherein each of said clamps has outwardly projecting legs, each of said outwardly projecting legs being in direct contact with an inner side of one of said substantially radially extending flanks, each of said clamps having two inner legs, which act on one of said filter elements on both sides, wherein one of said corrugation inner base portions is located between one of said outwardly projecting legs and another one of said outwardly projecting legs.

17. A device in accordance with claim 10, wherein additional filter material is enclosed between two of said filter elements, each of said filter elements being fixed at one of said corrugation inner base portions.

18. A device in accordance with claim 17, wherein an outer circumference of the at least one filter element has a shape adapted to a contour of the one of said corrugation inner base portions in some segments or over an entire circumference and partially extends over said one of said corrugation inner base portions.

19. A device for cleaning gases containing particles, the device comprising:
   a bellows comprising a bellows corrugation, said bellows corrugation defining at least a portion of an interior space of said bellows, said bellows corrugation comprising an outer crest portion, an inner crest portion and a substantially radially extending flank portion, said substantially radially extending flank portion being integrally connected to said outer crest portion and said inner crest portion;
   at least one filter element arranged in said interior space of said bellows, said at least one filter element being fixed at said inner crest portion in a positive-locking manner.

20. A device in accordance with claim 19, wherein said bellows comprises a longitudinal axis, said inner crest portion being located at a first distance from said longitudinal axis, said outer crest portion being located at second distance from said longitudinal axis, said first distance being less than said second distance, said bellows comprising a plurality of bellows corrugations, said bellows corrugations having a plurality of outer crest portions, said at least one filter element being arranged between one of said outer crest portions and an adjacent one of said outer crest portions.

* * * * *